March 9, 1926.

H. S. LEVY

METHOD OF DETERMINING AND CORRECTING THE RULED PLANE OF A
HALFTONE PROCESS SCREEN

Filed Oct. 18, 1923

HOWARD S. LEVY
*INVENTOR*

BY his *ATTORNEY*

Patented Mar. 9, 1926.

1,575,996

UNITED STATES PATENT OFFICE.

HOWARD S. LEVY, OF PHILADELPHIA, PENNSYLVANIA.

METHOD OF DETERMINING AND CORRECTING THE RULED PLANE OF A HALFTONE PROCESS SCREEN.

Application filed October 18, 1923. Serial No. 669,362.

*To all whom it may concern:*

Be it known that I, HOWARD S. LEVY, a citizen of the United States of America, residing at Philadelphia, county of Philadelphia, State of Pennsylvania, have invented new and useful Improvements in the Method of Determining and Correcting the Ruled Plane of a Halftone Process Screen, of which the following is a specification.

This invention relates to improvements in screens for half-tone photography and to a method of determining and correcting the plane of rulings in such a screen.

Screens for half-tone process work generally comprise two superposed glass plates having their adjacent surfaces provided with rulings arranged with the rulings of one plate at an angle to the rulings of the other plate. The plane of the rulings is an important factor and bears a certain definite relation to the sensitive surface of the photographic plate, this relation being considered perfect only when the plane of the rulings is in true parallelism to that of the plate. It has been found in practice, however, that it is virtually impossible to obtain plate glass of uniform thickness throughout, and consequently when the ruled glass plates are superposed, the plane of the rulings is likely in most cases to be at an angle to either one or the other outside surface of the screen. While ordinarily in manufactured plate glass all the surfaces of any given sheet are true planes in themselves, i. e. the surfaces are perfectly straight areas, they are not parallel to each other, and it follows that in placing two glass plates together, while the adjacent surfaces may be parallel, the outside faces of the screen resulting from the super-imposition of the plates are not parallel, either with each other or, what is more important, with the plane of the adjacent surfaces having the rulings. The importance of the need for parallelism in the screen surfaces becomes apparent in view of the fact that the only means by which the screen is mounted in the camera consists of a frame which embraces the edges and outside surfaces of the glass plates, so that it is the outside surfaces which are used to determine the position of the screen and not the plane of rulings, as it would be under ideal conditions.

When the plane of the ruling is oblique to the photographic plate "the screen distance" i. e., the distance from plate to ruling surface, is not the same at one end as at the other. The half-tone dot formation on the plate will consequently not be uniform for uniform tone values in the original. This is even more important in the case of circular screens used for color work. When these circular screens are rotated for the different angles for the different colors, the position of the oblique plane with respect to the sensitive plate changes the relative position of the screen and the plate so that the effect is, as for any one spot of the original, to vary the screen distance in every color separation negative.

Considering the almost absolute precision required in the photo-reproductive art to-day, the defective dots resulting from the above condition assume objectionable proportions and it is the purpose of the present invention to correct the screen so that the plane of rulings may be held parallel with respect to the photographic plate regardless of the surface planes of the screen, whereby uniform exposures are possible through the entire area of the screen. This purpose is accomplished by a method which consists generally of establishing the plane of the ruling by means of a microscope at one point of the ruling, then adjusting the elevation of the screen until the entire plane of rulings is disposed in focus, and thereafter grinding marginally about the screen a channel, the bottom surface of which is a true parallel with respect to the plane of rulings, and which is embraced by a frame to be received by the camera.

In the accompanying drawing, the necessary steps in carrying out the method are illustratively exemplified, but it will be understood that the apparatus shown is merely one of many forms which may be adopted for carrying the method into practice. Figure 1 is a cross-sectional view of a half-tone process screen showing the plane of the rulings obliquely disposed with respect to the opposite outside surfaces; Figure 2 is a view of the screen and an apparatus for determining and adjusting the position of the plane of rulings; Figure 3 is a view similar to Figure 2 showing the adjusted screen in the act of being provided with a marginal channel or shoulder which is parallel to the plane of rulings, and Figure 4 is a cross-sectional view of the screen showing a frame disposed about the marginal channel, the frame being parallel to the plane of rulings.

Referring to the drawings, A denotes a glass screen comprising two superposed plates 10 and 11 provided on their adjacent surfaces with parallel rulings at right angles to one another. The plane of these rulings is designated B and, as shown in Figure 1, it does not lie on a plane which is parallel to either outside surface of the screen.

The first step in the present method is to place the screen in a device having a revolving table 12, such as that shown in Figure 2, the table being mounted in a suitable bed frame 13 which carries a microscope 14 disposed above the table. The table is provided with an adjustable frame 15 in which the screen A is held so that as the margin of the screen is moved beneath the axis of the microscope the frame may be adjusted vertically to bring the rulings into focus.

Having completed the adjustment thus far the plane of the rulings B has been established coincident with the point of focus of the microscope 14. The microscope 14 may then be removed from the bed frame 13 and a grinding apparatus 16 substituted therefor, as shown in Figure 3. The grinding apparatus 16 comprises in general a narrow grinding wheel 17 which may be lowered against the margin of the screen and which is adapted to cut a shoulder C entirely around the upper or lower plate of the screen A.

The shoulder C thus formed is parallel to the plane of the rulings B and is provided with a metal frame 18, as shown in Figure 4, which embraces the shoulder on one side and the face of the plate 11 on the other side. The surface of the frame 18 overlying the shoulder C then becomes a surface which is parallel with the entire plane of rulings and which may be disposed in the camera so that the screen itself or the plate holder and plate may be adjusted to cause the frame 18 and the plate to assume parallel positions.

Having described my invention, what I claim is:—

1. The method of determining and correcting the plane of the ruling of a process screen, which consists in adjusting the plane of rulings to a point of focus and thereafter providing about the screen a supporting surface parallel with the adjusted plane of rulings.

2. The method of determining and correcting the plane of rulings of a process screen, which consists in adjusting the plane of rulings to a point of focus, grinding a surface marginally about said screen, the plane of the said surfaces being parallel with the adjusted plane of rulings, and thereafter framing the said screen about the marginal ground surface.

3. A process screen, comprising superposed plates having their adjacent surfaces provided with parallel rulings, said plates being further provided with planed marginal surfaces cut parallel with the plane of rulings, and a frame having parallel flanges embracing the planed marginal surfaces of both plates.

In testimony whereof I have affixed my signature.

HOWARD S. LEVY.